United States Patent
Meng et al.

(10) Patent No.: US 10,713,330 B2
(45) Date of Patent: Jul. 14, 2020

(54) OPTIMIZED BROWSER RENDER PROCESS

(71) Applicant: Google LLC, Mountain View, CA (US)

(72) Inventors: Biping Meng, Beijing (CN); Hao Fang, Beijing (CN); Hui Xu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 222 days.

(21) Appl. No.: 15/723,734

(22) Filed: Oct. 3, 2017

(65) Prior Publication Data

US 2018/0025091 A1    Jan. 25, 2018

Related U.S. Application Data

(63) Continuation of application No. 14/521,223, filed on Oct. 22, 2014, now Pat. No. 9,785,720, which is a
(Continued)

(51) Int. Cl.
*G06F 17/20* (2006.01)
*G06F 16/955* (2019.01)
(Continued)

(52) U.S. Cl.
CPC ........ *G06F 16/9566* (2019.01); *G06F 16/957* (2019.01); *G06F 40/14* (2020.01)

(58) Field of Classification Search
None
See application file for complete search history.

(56) References Cited

U.S. PATENT DOCUMENTS 5,845,115 A   12/1998  Bennett
5,933,832 A    8/1999  Suzuoka et al.
(Continued)

FOREIGN PATENT DOCUMENTS

CN    101075236 A    11/2007
CN    101201827 A     6/2008
(Continued)

OTHER PUBLICATIONS

"Limit or increase the quantity of content that is crawled 3 (Search Server 2008)", Microsoft Technet, Oct. 23, 2008, 9 pages.
(Continued)

*Primary Examiner* — Shahid K Khan
(74) *Attorney, Agent, or Firm* — Brake Hughes Bellermann LLP

(57) ABSTRACT

Implementations an optimizing a browser rendering process that identifies content neutral web pages and renders such web pages without scripting. An example method includes receiving a request to render a web page identified by a URL and, prior to rendering, determining that the URL is identified as content neutral URL in a data store. The method also includes rendering the web page with scripting turned off, regardless of browser settings for scripting, responsive to determining that the URL is a content neutral URL. Determining that the URL is a content neutral URL can include determining that the URL is content neutral for a type of browser handling the request to render the web page and/or sending a request to a service that determines whether the URL is a content neutral URL and receiving a response from the service indicating the URL is a content neutral URL.

20 Claims, 7 Drawing Sheets

Related U.S. Application Data continuation of application No. PCT/CN2014/080820, filed on Jun. 26, 2014.

(51) Int. Cl.
G06F 16/957 (2019.01)
G06F 40/14 (2020.01)

(56) References Cited

U.S. PATENT DOCUMENTS

| | | |
|---|---|---|
| 6,271,840 B1 | 8/2001 | Finseth et al. |
| 6,321,265 B1 | 11/2001 | Najork et al. |
| 6,393,526 B1 | 5/2002 | Crow et al. |
| 6,631,369 B1 | 10/2003 | Meyerzon et al. |
| 6,643,641 B1 | 11/2003 | Snyder |
| 6,665,838 B1 | 12/2003 | Brown et al. |
| 6,704,728 B1 | 3/2004 | Chang et al. |
| 6,714,905 B1 | 3/2004 | Chang et al. |
| 6,865,192 B1 | 3/2005 | Barrow |
| 7,054,917 B1 | 5/2006 | Kirsch et al. |
| 7,275,114 B2 | 9/2007 | Allen et al. |
| 7,536,389 B1 | 5/2009 | Prabhakar et al. |
| 7,548,915 B2 | 6/2009 | Ramer et al. |
| 7,779,105 B2 | 8/2010 | Uematsu et al. |
| 7,886,218 B2 | 2/2011 | Watson |
| 8,131,753 B2 | 3/2012 | Rybak et al. |
| 8,135,705 B2 | 3/2012 | Beynon et al. |
| 8,271,611 B2 | 9/2012 | Husa et al. |
| 8,316,124 B1 | 11/2012 | Baumback et al. |
| 8,346,755 B1 | 1/2013 | Kapoor et al. |
| 8,353,028 B2 | 1/2013 | Lalonde et al. |
| 8,504,695 B2 | 8/2013 | Hashimoto et al. |
| 8,527,504 B1 | 9/2013 | Krishnamurthy |
| 8,539,359 B2 | 9/2013 | Rapaport et al. |
| 8,543,580 B2 | 9/2013 | Chen et al. |
| 8,578,261 B1 | 11/2013 | Gupta et al. |
| 8,601,565 B1 | 12/2013 | Sakata et al. |
| 8,640,017 B1 | 1/2014 | Chang et al. |
| 8,650,493 B2 | 2/2014 | Miller |
| 8,655,865 B1 | 2/2014 | Sankaran et al. |
| 8,676,978 B2 | 3/2014 | Jiang et al. |
| 8,689,117 B1 | 4/2014 | Vasilik et al. |
| 8,707,162 B1 | 4/2014 | Jain |
| 8,738,686 B2 | 5/2014 | Douthart |
| 8,751,626 B2 | 6/2014 | Pinkston et al. |
| 8,892,543 B1 | 11/2014 | Kapoor et al. |
| 8,924,850 B1 | 12/2014 | Ramani et al. |
| 9,256,795 B1 | 2/2016 | Gray et al. |
| 9,736,212 B2 | 8/2017 | Eastham et al. |
| 10,284,623 B2 | 5/2019 | Eastham et al. |
| 2002/0065842 A1 | 5/2002 | Takagi et al. |
| 2002/0078143 A1 | 6/2002 | De Boor et al. |
| 2003/0041280 A1 | 2/2003 | Malcolm et al. |
| 2003/0172121 A1 | 9/2003 | Evans et al. |
| 2003/0191837 A1 | 10/2003 | Chen |
| 2003/0229677 A1 | 12/2003 | Allan |
| 2004/0123140 A1 | 6/2004 | Toomey |
| 2005/0055644 A1 | 3/2005 | Stockton |
| 2005/0108339 A1 | 5/2005 | Gleeson et al. |
| 2006/0069697 A1 | 3/2006 | Shraim et al. |
| 2006/0074911 A1 | 4/2006 | Neagovici-Negoescu et al. |
| 2006/0106844 A1 | 5/2006 | Naick et al. |
| 2006/0129463 A1 | 6/2006 | Zicherman |
| 2007/0005652 A1 | 1/2007 | Choi et al. |
| 2007/0061700 A1 | 3/2007 | Kothari et al. |
| 2007/0104208 A1 | 5/2007 | Svensson |
| 2007/0298773 A1* | 12/2007 | Uematsu ............. G06F 16/9577 455/414.2 |
| 2008/0010642 A1 | 1/2008 | MacLellan et al. |
| 2008/0044016 A1 | 2/2008 | Henzinger |
| 2008/0270659 A1 | 10/2008 | Grewal et al. |
| 2008/0301139 A1* | 12/2008 | Wang ............. H04L 63/1441 |
| 2009/0070869 A1 | 3/2009 | Fan et al. |
| 2009/0077198 A1 | 3/2009 | Larsson et al. |
| 2009/0164502 A1 | 6/2009 | Dasgupta et al. |
| 2009/0300768 A1 | 12/2009 | Krishnamurthy et al. |
| 2010/0057802 A1 | 3/2010 | McKeeth |
| 2010/0088612 A1 | 4/2010 | Jia et al. |
| 2010/0131488 A1 | 5/2010 | Dasdan et al. |
| 2010/0138485 A1 | 6/2010 | Chow et al. |
| 2010/0153544 A1 | 6/2010 | Krassner et al. |
| 2010/0161642 A1 | 6/2010 | Chen et al. |
| 2010/0169301 A1 | 7/2010 | Rubanovich et al. |
| 2010/0241621 A1 | 9/2010 | Randall |
| 2010/0262780 A1 | 10/2010 | Mahan et al. |
| 2011/0055314 A1 | 3/2011 | Rosenstein et al. |
| 2011/0055683 A1 | 3/2011 | Jiang |
| 2011/0083037 A1 | 4/2011 | Bocharov et al. |
| 2011/0099133 A1 | 4/2011 | Chang et al. |
| 2011/0119602 A1 | 5/2011 | Isozu |
| 2011/0167063 A1 | 7/2011 | Tengli et al. |
| 2011/0185287 A1 | 7/2011 | Dharmarajan et al. |
| 2011/0191309 A1 | 8/2011 | Anderson et al. |
| 2011/0202828 A1 | 8/2011 | Wan |
| 2011/0304625 A1 | 12/2011 | Gerhard et al. |
| 2012/0036264 A1 | 2/2012 | Jiang et al. |
| 2012/0158737 A1 | 6/2012 | Levy et al. |
| 2012/0194519 A1 | 8/2012 | Bissell et al. |
| 2012/0259833 A1 | 10/2012 | Paduroiu |
| 2012/0303425 A1 | 11/2012 | Katzin et al. |
| 2012/0317089 A1 | 12/2012 | Randall |
| 2012/0323881 A1 | 12/2012 | Liu et al. |
| 2013/0007586 A1 | 1/2013 | Thomas |
| 2013/0117252 A1 | 5/2013 | Samaddar et al. |
| 2013/0191360 A1 | 7/2013 | Burkard et al. |
| 2013/0218721 A1 | 8/2013 | Borhan et al. |
| 2014/0019953 A1 | 1/2014 | Kolesnikov et al. |
| 2014/0053056 A1 | 2/2014 | Weber et al. |
| 2014/0101136 A1 | 4/2014 | Mizuno et al. |
| 2014/0189534 A1 | 7/2014 | Liu et al. |
| 2014/0214788 A1 | 7/2014 | Koutrika |
| 2015/0172228 A1 | 6/2015 | Zalepa et al. |
| 2015/0371142 A1 | 12/2015 | Jain |
| 2015/0379014 A1 | 12/2015 | Xu et al. |
| 2015/0381699 A1 | 12/2015 | Eastham et al. |

FOREIGN PATENT DOCUMENTS

| | | |
|---|---|---|
| CN | 101587495 A | 11/2009 |
| CN | 101763357 A | 6/2010 |
| CN | 102663002 A | 9/2012 |
| CN | 102855318 A | 1/2013 |
| CN | 102902805 A | 1/2013 |
| CN | 102917067 A | 2/2013 |
| CN | 103034503 A | 4/2013 |
| EP | 1821215 B1 | 11/2011 |
| EP | 2728481 A1 | 5/2014 |
| JP | H11212889 A | 8/1999 |
| JP | 2002055872 A | 2/2002 |
| JP | 2002510819 A | 4/2002 |
| JP | 2002297619 A | 10/2002 |
| JP | 2011028779 A | 2/2011 |
| JP | 2011065488 A | 3/2011 |
| JP | 2011221616 A | 11/2011 |
| JP | 2012108744 A | 6/2012 |
| JP | 2012522322 A | 9/2012 |
| JP | 2013225220 A | 10/2013 |
| JP | 2015511347 A | 4/2015 |
| JP | 2017501512 A | 1/2017 |
| KR | 20110101414 A | 9/2011 |
| RU | 2425462 C2 | 7/2011 |
| WO | 03012576 A2 | 2/2003 |
| WO | 2006043664 A1 | 4/2006 |
| WO | 2006046323 A1 | 5/2006 |

OTHER PUBLICATIONS

Bixby, "15 things you can (and should) do to make your site faster for mobile users", Speed Awareness Month, retrieved on Nov. 16, 2017 from http://www.speedawarenessmonth.com/15-things-for-making-your-site-faster-for-mobile-users/, Aug. 29, 2012, 9 pages.

Campbell, "Testing Rx", Introduction to Rx, May 30, 2014, Amazon Digital Services LLC, XP055551320, 11 pages.

(56) References Cited

OTHER PUBLICATIONS

Notice of Allowance for U.S. Appl. No. 15/672,895, dated Jan. 3, 2019, 8 pages.
Extended European Search Report for European Application No. 14895657.6, dated Jan. 25, 2018, 8 pages.
First Office Action with English translation for Japanese Application No. 2016-567202, dated Jan. 15, 2018, 9 pages.
Office Action with English translation for Russian Application No. 2016148864 dated Mar. 2, 2018, 15 pages.
International Search Report and Written Opinion for PCT Application No. PCT/CN2014/080820, dated Mar. 27, 2015, 12 Pages.
Notice of Allowance for U.S. Appl. No. 14/531,080, dated Feb. 21, 2017, 9 pages.
U.S. Appl. No. 14/521,223, filed Oct. 22, 2014, allowed.
First Examination Report for Indian Application No. 201747002051, dated May 11, 2020, 7 pages.
Notice of Allowance (with English translation) for Korean Application No. 10-2017-7021521, dated Apr. 22, 2020, 3 pages.

* cited by examiner

OPTIMIZED BROWSER RENDER PROCESS

CROSS-REFERENCE TO RELATED APPLICATIONS

This application is a continuation of, and claims priority to, U.S. application Ser. No. 14/521,223, filed on Oct. 22, 2014, which is a continuation under 35 U.S.C. § 120 of PCT Patent Application No. PCT/CN2014/080820, filed on Jun. 26, 2014, entitled "OPTIMIZED BROWSER RENDER PROCESS". The disclosures of these earlier-filed applications are incorporated herewith in their entirety.

BACKGROUND

Many web pages are dynamically created, meaning that the final page viewed by the user of a web browser is generated at least partially by the browser rendering process. Embedded objects, such as script, images, and style sheets, are often embedded in the web page and affect the content and appearance of the rendered web page. For example, executing script objects, such as JavaScript code, often affects how a web page appears to a user and changes the content displayed for the page. But running script objects is processing intensive and often results in downloading other embedded object, which can be burdensome to network bandwidth and can slow the loading of the web page. In mobile computing device, such as smart phones and tablets, such additional activities can drain battery power.

SUMMARY

Implementations identify content neutral web pages, in other words web pages where the script objects do not affect the content of the rendered web page in any significant way. Patterns for identifying the content neutral web pages may be stored and provided to browsers. When a browser is ready to render a web page it may check to see if the web page fits one of the patterns. If it does, the browser may render the web page with script turned off. This allows the browser to more efficiently render web pages without affecting the content displayed to a user. In some implementations, the patterns may include a browser type, such as mobile vs. full, because some web pages may be content neutral for a mobile browser, for example in a smart phone, but not for other types of browsers.

In one aspect, a system includes at least one processor and memory storing instructions that, when executed by the at least one processor, cause the system to perform operations. The operations include generating a first rendering result of a web page, the first rendering result being rendered with scripting turned on, and generating a second rendering result of the web page, the second rendering result being rendered with scripting turned off. The operations also include determining whether differences in the first rendering result and the second rendering result are content neutral and, when the differences are content neutral, identifying a URL for the web page as a content neutral URL.

One or more of the implementations of the subject matter described herein can be implemented so as to realize one or more of the following advantages. For example, determining whether any differences in the first rendering result and the second rendering result are content neutral may include identifying an outlink in the first rendering result missing from the second rendering result and determining, responsive to identifying the outlink, that the differences are not content neutral. As another example, determining whether any differences in the first rendering result and the second rendering result are content neutral can include identifying a token in the first rendering result that is missing from the second rendering result and determining, responsive to identifying the token, that the differences are not content neutral. As another example, determining whether any differences in the first rendering result and the second rendering result are content neutral may include identifying a quantity of tokens in the first rendering result that are missing from the second rendering result, determining that the quantity meets a threshold, and determining, responsive to determining the quantity meets the threshold, that the differences are not content neutral. Stop words may be removed prior to determining differences in the tokens.

As another example, determining whether any differences in the first rendering result and the second rendering result are content neutral may include calculating a similarity score between a major component of the first rendering result and a major component of the second rendering result, determining whether the similarity score meets a similarity threshold, and determining that the differences are content neutral when the similarity score meets the similarity threshold.

As another example, the operations may also include, for each of a plurality of web pages in fetch records, generating a first rendering result of the web page, the first rendering result being rendered with scripting turned on, generating a second rendering result of the web page, the second rendering result being rendered with scripting turned off, and comparing the first rendering result with the second rendering result to determine whether the web page is content neutral. When the web page is content neutral the operations may include storing a URL for the web page in a list of content neutral URLs and when the web page is not content neutral, storing a URL for the web page in a list of non-content neutral URLs. The operations may also include determining at least one pattern using the list of content neutral URLs and storing the pattern in a content neutral URL data store. In some implementations, the operations may also include determining whether the pattern applies to a URL in the list of non-content neutral URLs and storing the pattern in the content neutral URL data store when the pattern fails to apply to a URL in the list of non-content neutral URLs. In some implementations, the operations may include determining a percentage of URLs that match the pattern that are non-content neutral URLs and storing the pattern in the content neutral URL data store when the percentage is less than one percent.

In another aspect, a computer implemented method includes generating, using at least one processor, a first rendering result of a web page, the first rendering result being rendered with scripting turned on and generating a second rendering result of the web page, the second rendering result being rendered with scripting turned off. The method may also include comparing the first rendering result with the second rendering result to determine whether the web page is content neutral and storing a Uniform Resource Locator (URL) for the web page in a list of content neutral URLs when the web page is content neutral.

One or more of the implementations of the subject matter described herein can be implemented so as to realize one or more of the following advantages. For example, the method may also include, for each of a plurality of web pages in fetch records, generating a first rendering result of the web page with scripting turned on, generating a second rendering result of the web page with scripting turned off, and comparing the first rendering result with the second rendering result to determine whether the web page is content neutral. The method may also include storing a URL for the web page in the list of content neutral URLs when the web page is content neutral and storing a URL for the web page in a list of non-content neutral URLs when the web page is not content neutral. The method may further include determining at least one pattern from the list of content neutral URLs and storing the pattern in a content neutral URL data store. In some implementations, the method may also include determining a first quantity of URLs in the list of content neutral URLs that match the pattern, determining a second quantity of URLs in the list of non-content neutral URLs that match the pattern, and storing the pattern in the content neutral URL data store when the second quantity is less than one percent of a sum of the first quantity and the second quantity.

In another aspect, a method includes receiving a request to render a web page identified by a URL and, prior to rendering, determining that the URL is a content neutral URL. The method may also include rendering the web page with scripting turned off, regardless of browser settings for scripting, responsive to determining that the URL is a content neutral URL. In some implementations, determining that the URL is a content neutral URL includes determining that the URL matches a predetermined pattern in a data store of content neutral URLs. In some implementations, determining that the URL is a content neutral URL includes determining that the URL is content neutral for a type of browser handling the request to render the web page. In some implementations, determining that the URL is a content neutral URL includes sending a request to a service, the service determining whether the URL is a content neutral URL, and receiving a response from the service indicating the URL is a content neutral URL.

In another aspect, a non-transitory computer-readable medium may include instructions executable by at least one processor formed in a substrate that cause a computer system to perform one or more of the methods described above.

One or more of the implementations of the subject matter described herein can be implemented so as to realize one or more of the following advantages. As one example, rendering a web page with scripting turned off saves CPU and network bandwidth and battery consumption on mobile devices. But because many web pages use script to load the content of the web page, using a browser setting to always turn scripting off causes the viewer to lose content. The data store of content neutral patterns allows the browser to selectively turn scripting off when scripting does not affect content. Turning off scripting for content neutral URLs results in faster load times, reduced CPU usage, reduced RAM usage (because the system does not need to start a scripting engine) and reduced power consumption.

DETAILED DESCRIPTION

Disclosed implementations identify content neutral web pages, or pages where the script objects are content neutral to the rendered page, and allow the browser rendering engine to render such web pages without running script. This improves rendering time, often by a factor of three, which is important for computing devices with limited resources, such as smart phones and tablets. A web page may be a candidate for optimized rendering when a rendering result of the web page rendered with scripting turned on is similar to a rendering result of the web page rendered with scripting turned off. Similarity may be determined by similarity of tokens in the page, similarity of outlinks, similarity of the page layout, etc. In some implementations, any differences in outlinks or tokens may be considered significant differences. In some implementations, when the major components of the layout have a similarity metric that meets a threshold, the rendering result may be considered similar. If the script objects in a page are content neutral, the system may store the web page in a list of content neutral URLs. In some implementations, the system may aggregate content neutral URLs to identify a pattern that can be used to identify other content neutral URLs.

When a browser begins rendering a web page it may ask a service if the script objects for the web page are content neutral, i.e., if the URL is content neutral. The service may match the URL of the requested web page to a data store of content neutral URLs, either by exact match or matching a pattern in the data store. If the service finds a match the service may tell the browser the scripts objects are content neutral and the browser may proceed to render the web page with scripting turned off. Otherwise, (e.g., if the URL for the web page does not match a pattern in the data store), the browser will render the page with script turned on, or use the browser setting to determine whether to run script when rendering the web page. Such optimized browser rendering makes the browser rendering process much more resource efficient. In some implementations, the content neutral URL data store may distinguish between mobile browsers and desktop browsers.

Figure 1:
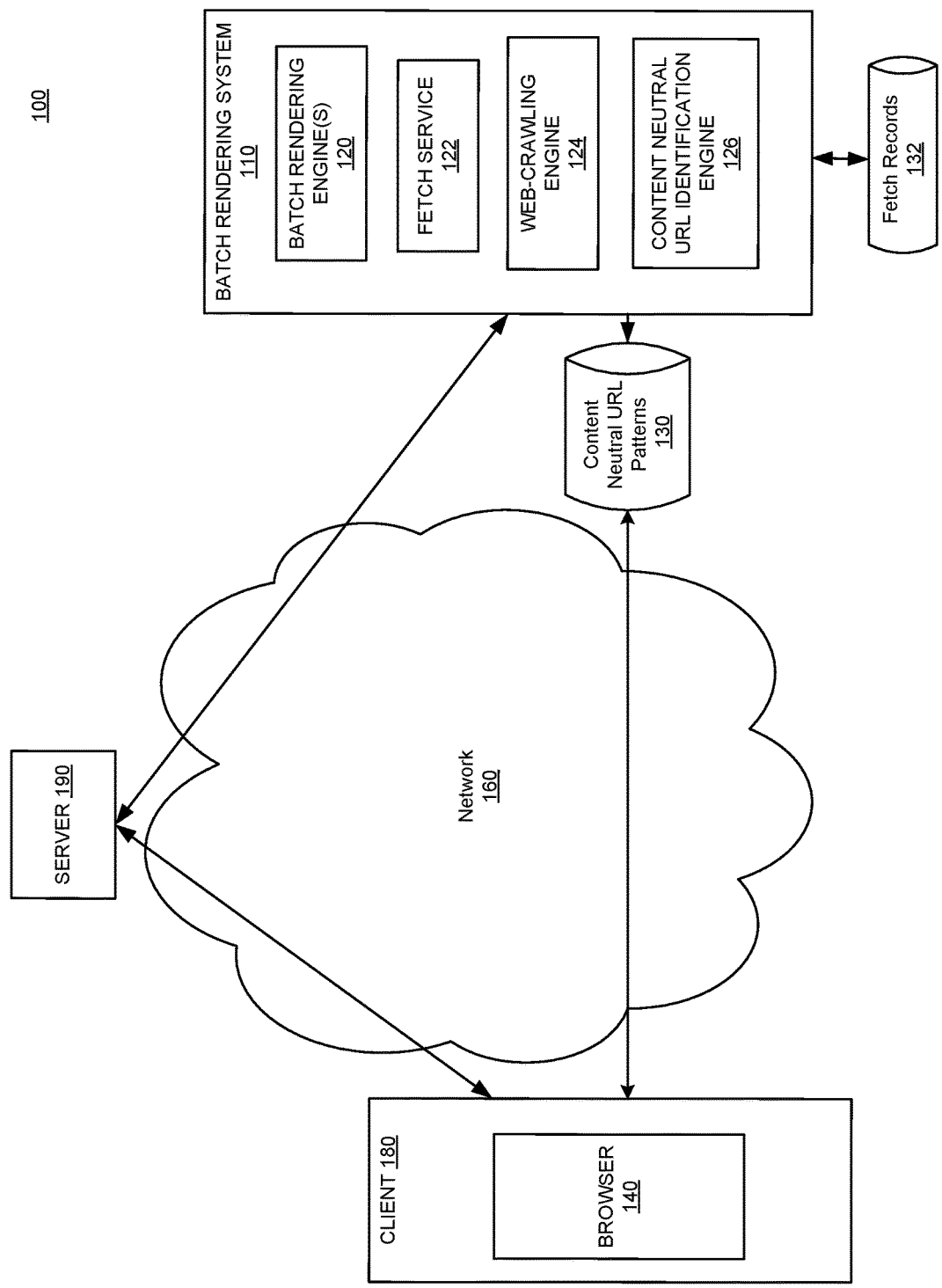
FIG. 1 illustrates an example system in accordance with the disclosed subject matter.
Figure 6:
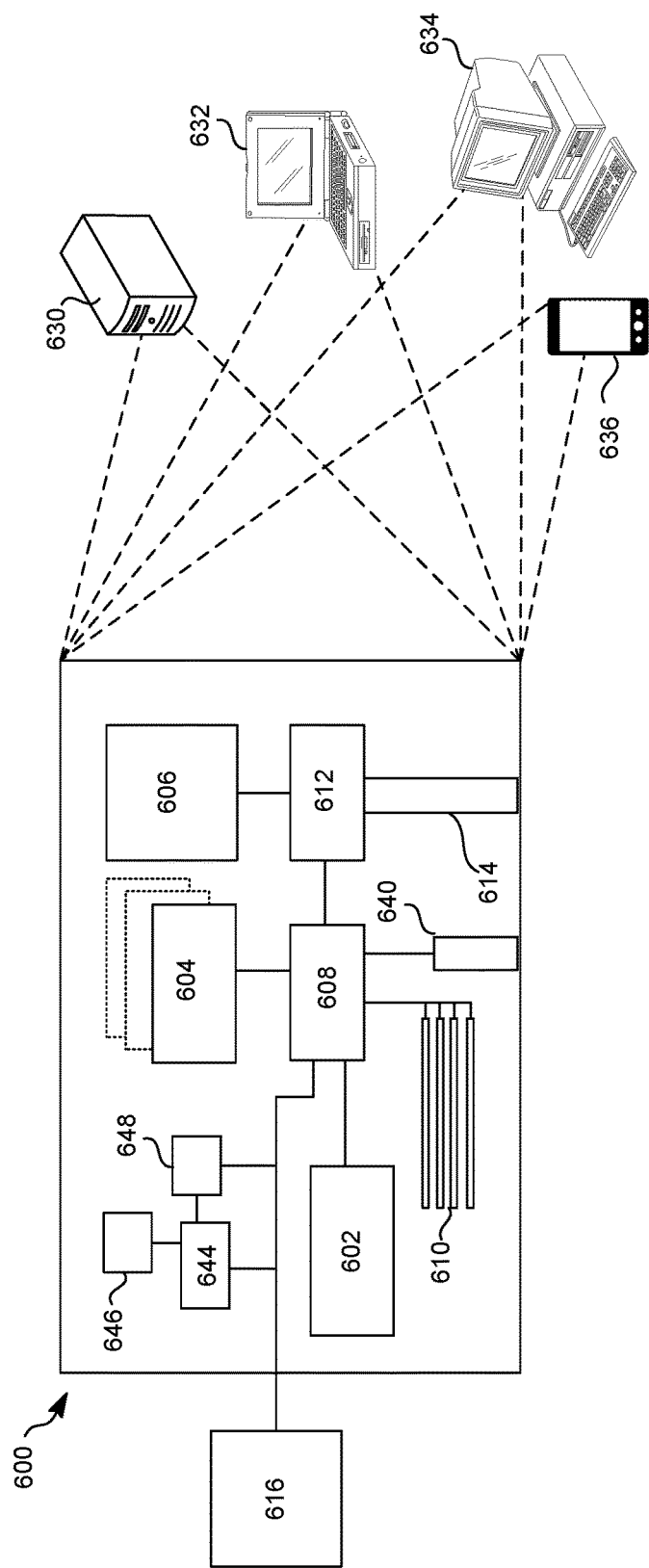
FIG. 6 shows an example of a computer device that can be used to implement the described techniques.
Figure 7:
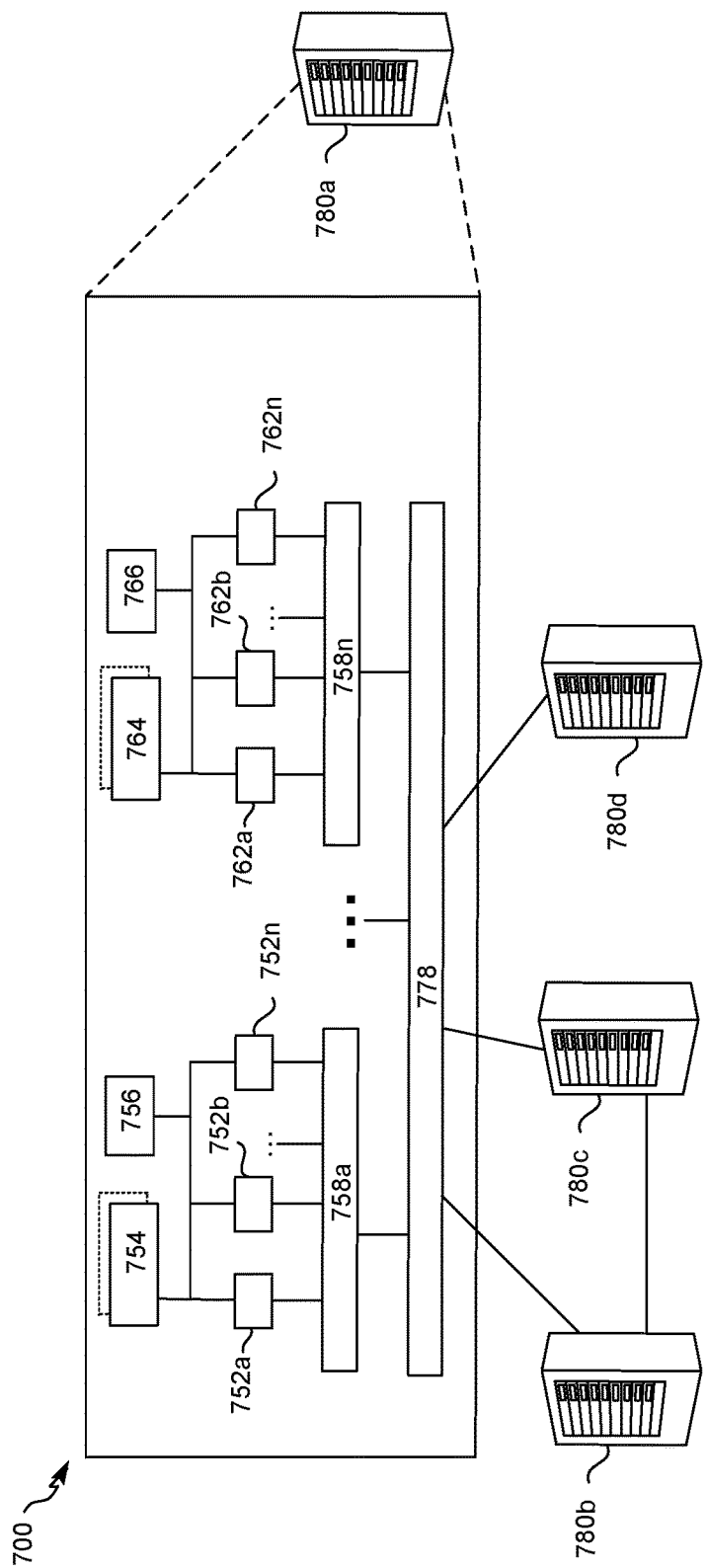
FIG. 7 shows an example of a distributed computer device that can be used to implement the described techniques.

FIG. 1 is a block diagram of a system in accordance with an example implementation. The system 100 may be used to identify content neutral URLs and content neutral URL patterns and use the patterns to optimize a browser rendering process. The system 100 may include computing devices that take the form of a number of different devices. For example, the system 100 may include computing devices that are examples of computer device 600, as depicted in FIG. 6, and computer device 700, as depicted in FIG. 7.

The system 100 may include a batch rendering system 110. The batch rendering system 110 may be a standard server, a group of such servers, a client-server system, or a rack server system. In addition, the batch rendering system 110 may be implemented in a personal computer. The batch rendering system 110 may include one or more processors configured to execute one or more machine executable instructions or pieces of software, firmware, or a combination thereof, stored in memory. For example, the batch rendering system 110 may include rendering engines 120, fetch service 122, web-crawling engine 124, and content-neutral URL identification engine 126. The batch rendering system 110 may produce a rendered web page in batch mode, for example as part of an indexing process, and in the process produce fetch records 132, which the batch rendering system 110 may use to generate content neutral URL patterns 130.

A downstream process may request that the batch rendering system 110 render a web page in batch mode. In some implementations, the batch rendering system 110 may include the downstream process (not shown). For example, the downstream process may be an indexing engine or an advertising platform. The downstream process may request that one of the batch rendering engines 120 generate a rendering result for a particular web page. Each batch rendering engine 120 may be configured to emulate a renderer for personal web browser, but with optimizations for batch rendering. The web page may include embedded objects, such as such as style sheets, JavaScript, images, etc. The batch rendering engines 120 may request the contents for the embedded objects using the fetch service 122.

The fetch service 122 may determine which embedded objects need to be fetched from the host server 190, which embedded objects can be returned from a cache, and which objects do not need to be returned. Host servers 190 may be any type of computing device accessible over the Internet that hosts one or more web pages or resources embedded in one or more web pages. If an embedded object needs to be fetched, the fetch service 122 may request the content for the embedded object via web-crawling engine 124 using conventional techniques. A downstream process, such as an indexing engine, may also request content from servers 190 via web-crawling engine 124. As a result of the fetch requests, the batch rendering system 110 may generate fetch records 132. Fetch records 132 may include information about which web pages were requested and retrieved from host servers 190.

The web-crawling engine 124, the batch rendering engines 120, and the fetch service 122 work together to efficiently render a large number of web pages, such as web pages that can be found on the World Wide Web. The result of the render of a web page is a rendering result, which includes various data elements useful to and otherwise unavailable to the downstream requesting process. The content neutral URL identification engine 126 may use the batch rendering engines 120 to generate content neutral URL patterns 130. The content neutral URL identification engine 126 may run periodically (e.g., daily, twice a week, etc.), using the fetch records 132 as input. The content neutral URL identification engine 126 may ask the batch rendering engines 120 to generate a first rendering result of a URL from the fetch records 132 with scripting turned on and to generate a second rendering result of the URL with the scripting turned off. Script objects, such as JavaScript, are code included in web pages that are executed at the time the web page is rendered by the browser. Script objects can manipulate the look and content of the rendered web page, initialize execution of other script objects, download additional content from the Internet, etc. Thus, script objects are intended to be executed by the browser. But running script objects consumes a high level of processing resources and often results in additional content fetches, which slows the rendering process, ties up bandwidth, and consumes power resources. While browsers typically include a setting to turn scripting off, which speeds up the rendering process, the resulting content can be affected and the page may not render correctly or may be missing content.

To determine whether the rendered content of the URL is affected by running script objects, the content neutral URL identification engine 126 requests a first rendering result of the URL with scripting turned on and a second rendering result of the URL with scripting turned off. For example, the content neutral URL identification engine 126 may request that one of the batch rendering engines 120 provide the rendering results. The content neutral URL identification engine 126 may compare the first rendering result and the second rendering result to determine whether running script objects affect the content of the rendered web page. In some implementations, if the content is affected, the URL may be added to a list of non-content neutral URLs. If the contents are not significantly affected (e.g., are similar), the content neutral URL identification engine 126 may identify the URL as content neutral. In some implementations, the URL may be stored in a data store, such as content neutral URL patterns 130. In some implementations, the URL may be stored in a temporary list of content neutral URLs and used at a later time to determine patterns for content neutral URLs. Accordingly, in some implementations, the content neutral URL identification engine 126 performs this test over many URLs and determines patterns of URLs that are content neutral. For example, the content neutral URL identification engine 126 may aggregate the content neutral status for all URLs belonging to the same host. If all URLs for the host are content neutral, the host may be included as a pattern in the content neutral URL patterns 130. In some implementations, if a small percentage (e.g., less than 1%) of URLs matching the pattern are content neutral, the content neutral URL identification engine 126 may include the host as a pattern in the content neutral URL patterns 130. In some implementations, aggregation of the lists of content neutral URLs and non-content neutral URLs may produce other patterns may also be used, e.g., for certain paths within the host.

In some implementations, the content neutral URL identification engine 126 may also verify that patterns in the content neutral URL patterns 130 are still content neutral. For example, the content neutral URL identification engine 126 may select a sample of URLs matching the pattern, ask the rendering engine to generate a rendering result with scripting turned on and with scripting turned off, and compare the two rendering results. If a URL matching a pattern in the content neutral URL patterns 130 is no longer content neutral, the pattern may be removed.

In some implementations, the content neutral URL identification engine 126 may determine whether a URL or URL pattern is content neutral for mobile browsers separately from traditional personal browsers. For example, some websites have a mobile version of a web page and a full version, and the mobile version may be content neutral while the full version is not. Thus, the content neutral URL identification engine 126 may render four rendering results for a URL. The first two rendering results may be rendered by a rendering engine that emulates a traditional personal browser, while the last two rendering results may be rendered by a rendering engine that emulates a browser on a mobile device, such as a smart phone or tablet. The content neutral URL patterns 130 may, thus, include data indicating whether the pattern is content neutral by browser type, e.g., for a mobile browser or for a traditional browser.

Although not shown in FIG. 1 for the sake of brevity, in some implementations, the batch rendering system 110 may be distributed over two or more separate computing devices.

In addition, one or more of the batch rendering engines 120, the fetch service 122, the web-crawling engine 124, and the content neutral URL identification engine 126 may be distributed across one or more computing devices. In some implementations, one or more of the batch rendering engines 120, the fetch service 122, the web-crawling engine 124, and the content neutral URL identification engine 126 may share resources, such as memory or hardware processors with other components of the batch rendering system 110. Similarly, fetch records 132 and content neutral URL patterns 130 may also be stored in memory distributed across multiple computing devices. In some implementations, the various components of the batch rendering system 110 may share hardware components of a computing device, or may be logical partitions of the same computing device.

The batch rendering system 110 may be in communication with the client(s) 180 and servers 190 over network 160. Network 160 may be for example, the Internet or the network 160 can be a wired or wireless local area network (LAN), wide area network (WAN), a combination of these, etc., implemented using, for example, gateway devices, bridges, switches, and/or so forth. Via the network 160, the batch rendering system 110 may communicate with and transmit data to/from clients 180 and/or host servers 190. For example, the batch rendering system 110 may provide content neutral URL patterns 130 to a client 180, or may receive a request from client 180 asking whether a particular URL is content neutral and may provide a response based on the content neutral URL patterns 130.

The client 180 may be a personal computing device, such as computing device 600 depicted in FIG. 6, with a personal web browser 140 installed. Examples of personal web browsers include CHROME, SAFARI, INTERNET EXPLORER, FIREFOX, etc., whether for a mobile device such as a smart phone or tablet, or a personal computer, such as a laptop or desktop. The browser 140 may be configured to use a service to determine whether a particular URL can be rendered with scripting turned off. In some implementations, the service may push a copy of the content neutral URL patterns 130 to the client 180 for use by the browser 140. In some implementations, the browser 140 may be configured to ask the service to determine if a particular URL matches one of the patterns in the content neutral URL patterns 130. The browser 140 performs optimized rendering by using the service to determine whether a particular URL can be rendered with scripting turned off and performing the rendering with scripting turned off when the particular URL is content neutral. Thus, the browser 140 may be configured to selectively turn scripting on and off without action by the user, regardless of a script browser setting, and can do so to conserve resources where the content is not affected.

Figure 2:
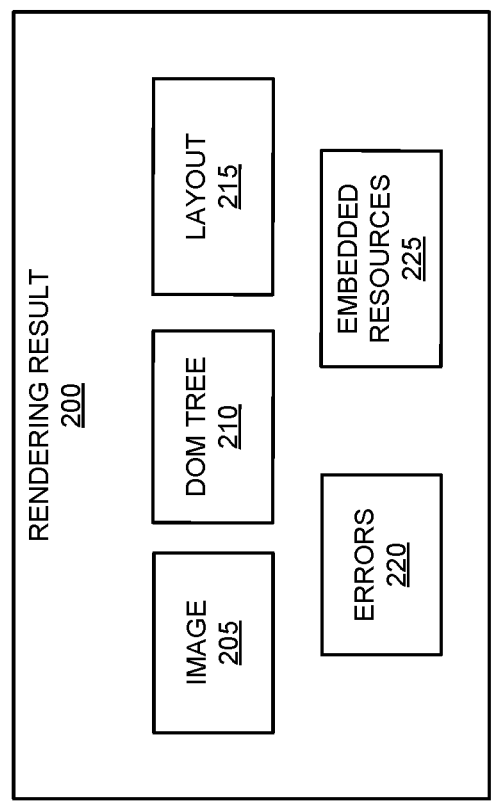
FIG. 2 is a block diagram of a rendering result for a rendered web page, according to an implementation.

FIG. 2 is a block diagram of a rendering result 200 rendered by a batch rendering engine 120, according to an implementation. The rendering result 200 may include a variety of components, not all of which are illustrated in FIG. 2. For example, the rendering result 200 can include an image 205 of the rendered page. The image 205 may be the image that would be displayed via a display device to a user via a web browser. The image 205 can be used, for example, to display a thumbnail of the rendered page to a user and to determine where on the display elements of the web page occur (e.g., based on their x and y coordinates). The rendering result 200 can also include a Document Object Model (DOM) tree 210. The DOM tree 210 represents the HTML structure of the web page. For example, the DOM tree 210 includes tokens and outlinks for the web page. The rendering result 200 may also include layout 215. Layout 215 includes a box for each element of the web page, the box specifying the x and y coordinates of the element in the image 205. Thus, the layout 215 provides an indication of where on the web page an element occurs, how much space it takes on the web page, etc. Thus, the layout 215 provides information on how much of the web page is ads, how prominent a paragraph is (e.g., above-the-line or below-the-line), whether the element is visible, etc. In other words, the layout 215 provides geometric information about the elements of the rendered web page. The rendering result 200 may also include errors 220. Errors 220 include errors encountered as a result of running script objects, e.g., JavaScript. The rendering result 200 may also include a list of embedded resources 225 fetched during the rendering, and can include other elements (not shown) generated as part of the rendering process. Thus, the rendering result 200 provides information not available solely via a fetch of content from the hosting server. Downstream requesting processes, such as a content neutral URL identification engine, can use the rendering result information for various purposes, such as to determine whether running script objects significantly changes the content of a rendered web page. For example, content in an advertising portion of a web page may not be considered important, so a URL may still be content neutral even with differences in an advertising portion. In some implementations, only differences in major components of the layout may be considered important. The major components may be the largest boxes in the layout 215 (e.g., the boxes with the largest height and width).

Figure 3:
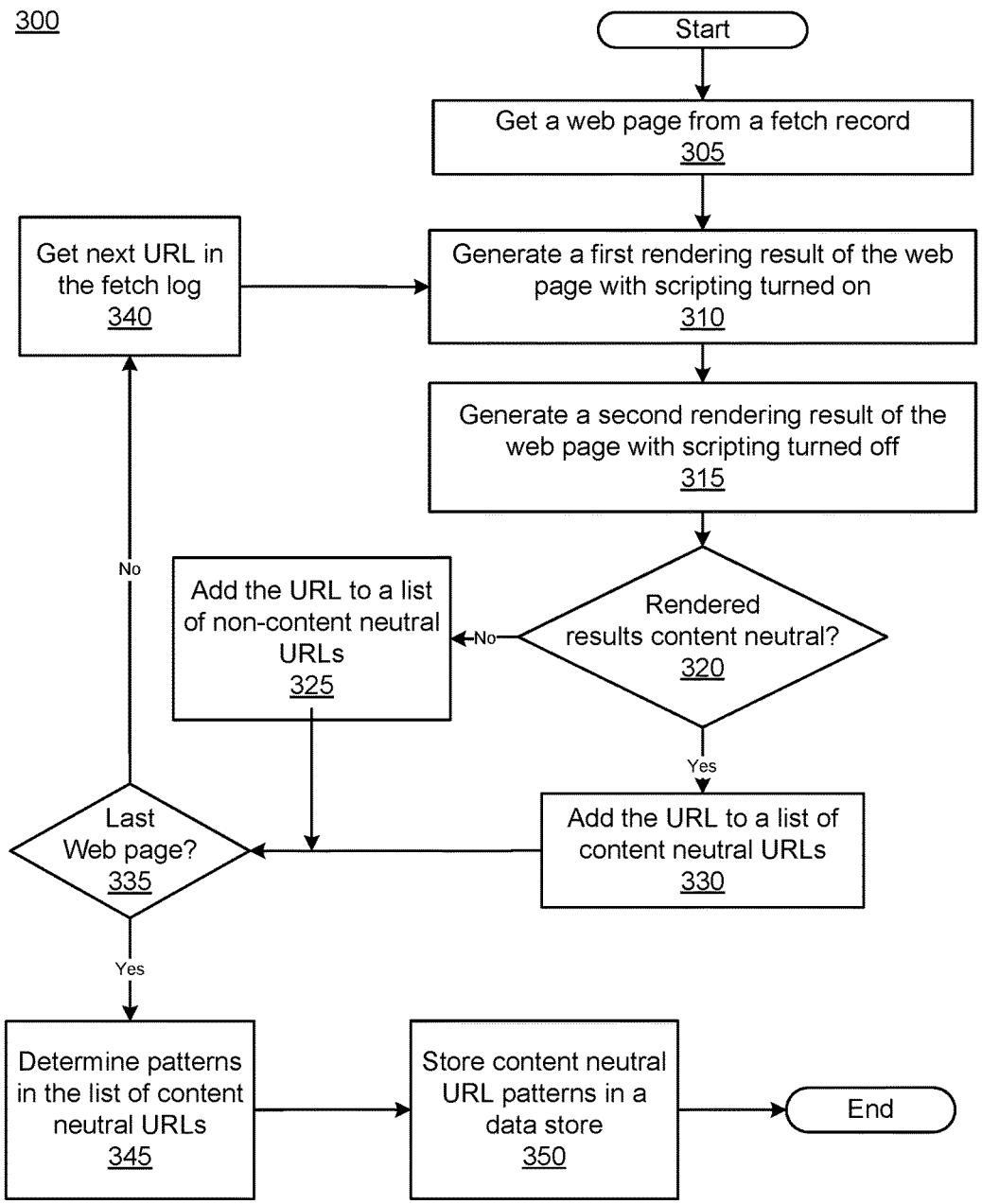
FIG. 3 is a flowchart illustrating an example process for identifying content neutral URL patterns, according to an implementation.

FIG. 3 is a flowchart illustrating an example process 300 for identifying content neutral URL patterns, according to an implementation. The process 300 may be performed by a system, such as system 110 of FIG. 1. The system may use process 300 to generate a rendering result of a web page with scripting turned on, to render a second rendering result of the web page with scripting turned off, and to compare the rendering results to determine if scripting affects the content in any significant or important manner, or in other words if the scripting is content neutral. In some implementations, the system may determine patterns for content neutral URLs based on the rendering results of particular URLs. The patterns may be stored in a data store and used as part of a service that allows a personal browser (whether full or mobile) to optimize rendering by turning off scripting when a requested URL is content neutral.

Process 300 may begin with the system obtaining a web page from a fetch record (305). The fetch record may be from a file that logs fetch requests for web pages or embedded objects via a web-crawling engine. In some implementations, the fetch records may be generated as part of an indexing process, for example an indexing process for documents available via the Internet. The web page may be identified in the fetch record by an identifier, such as a URL. Thus, a web page may also be referred to as a URL, and it is understood that reference to a web page and a URL are generally synonymous as used herein. The system may generate a first rendering result of the web page with scripting turned on (310). In other words, the system may run JavaScript (or other scripting languages) when generating the first rendering result. The system may also generate a second rendering result for the web page with scripting turned off (315). The system may then compare the first rendering result and the second rendering result to determine if the rendering results are content neutral (320).

Figure 4:
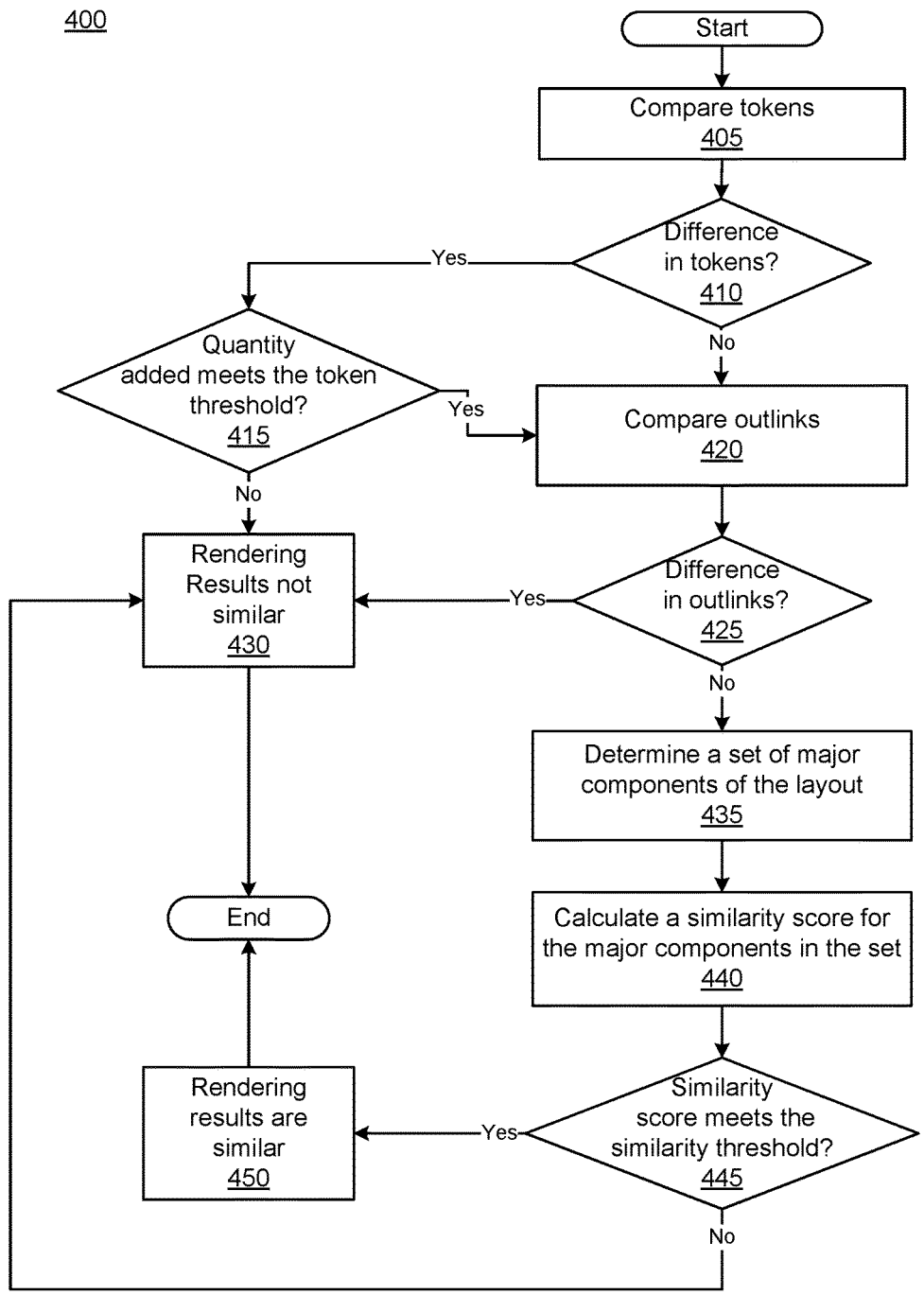
FIG. 4 is a flowchart illustrating an example process for determining whether two rendering results are content neutral, according to an implementation.

The system may use a variety of tests to determine whether the rendering results are content neutral, as discussed in more detail with regard to FIG. 4. If the rendering results are content neutral (320, Yes), the system may add the URL of the web page to a list of content neutral URLs (330). This list may be a temporary list used to determine patterns for content neutral URLs. If the rendering results are not similar (320, No), the system may add the URL of the web page to a list of non-content neutral URLs (325). The web pages in this list cannot be rendered with scripting turned off without losing content. The list of non-content neutral URLs may also be a list stored in temporary memory and used to determine patterns for content neutral URLs. If there are other web pages in the fetch records to examine (335, No), the system may get the next URL from the fetch records (340) and repeat steps 305 to 330 using the next web page. In some implementations, the cycle represented by steps 305 to 340 may continue until all URLs in the fetch records have been examined for content neutrality. In some implementations, only fetch records after a certain date or time may be examined.

If all web pages in the fetch records have been examined for content neutrality (335, Yes), the system may determine patterns for content neutral URLs using the list of content neutral URLs and the list of non-content neutral URLs (345). In some implementations, the system may strip off any query strings that are part of the URL with the potential pattern being the remainder of the URL. URLs match the potential pattern if the remaining portion without the query string matches. In some implementations, the system may strip off everything but the host portion of the URL. URLs match the pattern if the host portion matches, regardless of what comes after. In some implementations, the system may use other forms of aggregation, such as clustering, to determine patterns. The pattern may reflect a host (e.g., www-.pattern.com), or may reflect different directories within the host (e.g., www.pattern.com/services), etc. To see if a potential pattern is content neutral, the system may determine the quantity of URLs in the non-content neutral URL list that match a pattern and the quantity of URLs in the content neutral URL list that match the pattern. In some implementations, if a URL in the non-content neutral URL list matches a potential pattern, the potential pattern is considered non-content neutral. In some implementations, a small percentage, e.g., 1% or less, of URLs matching a potential pattern can be non-content neutral and the pattern may still be considered content neutral. If a potential pattern is content neutral, the system may store the pattern in a data store (350). The data store may be used by a service to allow a browser to optimize the rendering of a web page by turning scripting off when the scripting does not affect the content (e.g., the URL is content neutral).

In some implementations, the system may repeat some or all of process 300 with rendering results rendered by a different browser type. For example the browser type may be a full browser or a mobile browser. If the first and second rendering result were rendered by a full browser, the system may repeat steps 305 to 335 using a mobile browser. Thus, the list of content neutral URLs may include an indication of browser type, and the patterns in the data store may also include an indication of browser type. This allows the system to indicate whether the URL is content neutral for one browser type (e.g., a mobile browser) and not for a different browser type (e.g., a full browser).

FIG. 4 is a flowchart illustrating an example process 400 for determining whether two rendering results are content neutral, according to an implementation. Process 400 may be performed, for example, as part of step 320 of FIG. 3. While process 400 illustrates three tests for determining rendering result similarity, it is understood that implementations may include one, two, or all of the tests illustrated, and may include additional similarity tests not illustrated.

Process 400 may include comparing the tokens in the two rendering results (405). The tokens include the text of a document, e.g., the words visible to a user. The tokens may be produced by processing the DOM tree, such as DOM tree 210 of FIG. 2. In some implementations, stop words and numbers may be removed before performing the comparison. If the tokens for the first rendering result differ from the tokens for the second rendering result (410, Yes), the system may optionally determine whether the quantity of unique tokens added by rendering with scripting turned on is less than a token threshold (415). In other words, if rendering with scripting turned on only results in a few unique tokens, the system may consider the differences insignificant. In some implementations the token threshold may be 5. If the quantity of unique tokens added meets the token threshold (415, No), the system may consider the rendering results not similar (430). When the rendering results are not similar, the URL used to generate the rendering results is not content neutral. In some implementations, the system may skip test 415 and any differences in tokens may be considered significant and the rendering results not similar. If the quantity fails to meet the token threshold (415, Yes), the system may consider the difference in tokens insignificant. Thus, if the unique tokens for the first rendering result are the same as the tokens in the second rendering result (410, No) or the quantity of unique tokens fails to meet the token threshold (415, Yes), the rendering results may be considered similar, and the system may continue to perform other tests. In implementations that include only the token test, the system may proceed directly to step 445, with a determination that the rendering results are similar.

In some implementations, if the tokens are the same (410, No) or (415, Yes), the system may compare outlinks (420). Outlinks represent links to other web pages or other documents from the rendered page. The outlinks may also be extracted from anchor tag nodes (<a> tags) of the DOM tree of the rendering result. If the system finds a difference in outlinks (425, Yes), the system may consider the difference significant and the rendering results are not similar (430). Thus, the web page is not considered content neutral. If the outlinks in the two rendering results are the same (425, No), the system may consider the rendering results similar (e.g., by proceeding to step 450), or may go on to perform other similarity tests. In some implementations, the system may perform steps 420 and 425 before and independently of steps 405 and 415.

In another similarity test, the system may determine major components of the layout (435). The layout of a rendering result is made up of boxes—each box being defined by screen coordinates. Generally, each box corresponds to a respective element of the web page. For example, the layout can include box representations of DOM nodes in the DOM tree (although not every DOM elements may have a corresponding render box). The boxes can be organized in a tree structure, also known as a render tree. Thus, for example, a table may be represented by a box in the layout, and a paragraph may be represented by another box in the layout. Major components of a web page are those elements in the layout with the largest boxes, as defined by the screen coordinates. In some implementations, the system may put a predetermined quantity of the major components in the set, e.g., so that the set includes the largest of the major components. In some implementations, the system may include the major components that make up a percentage of the screen in the set. In such an implementation, if the largest major component takes up more than the percentage, the largest major component may be the only member of the set. In some implementations, any components with a box size above a threshold may be included in the set of major components. In some implementations the system may use an onion peeling technique to find the major component. For example, starting at the root box of the render tree, the system may perform a breadth-first search and identify the largest child box of the root box. The system may then select the largest child and go deeper, finding the largest child box of the current box (e.g., the largest child box of the root box). The system may stop going deeper when none of the child boxes are dominating, for example occupying over half of the parent box's area. When the system stops going deeper, the major component is the box that failed to have a dominating child.

The system may calculate a similarity score between the major components in the set (440). For example, the system may use an overlapping score of the major component boxes. In an overlapping score, the system may calculate an overlap area for the major component, which represents an area of the major component in the first rendering result that overlaps with the area of the corresponding major component in the second rendering result. The system may then calculate a similarity score which represents the harmonic average of the overlap area with regard to the total area of each major component. For example, the system may use the formula $$\frac{2}{((a1/oa)+(a2/oa))}$$

where oa is the overlapping area between the two components, a1 is the total area of the major component box in the first rendering result and a2 is the total area of the major component box in the second rendering result. Of course, the system may use other similarity metrics to calculate the score. Examples of such similarity metrics include, but are not limited to, Katz similarity. If the similarity score meets a similarity threshold (445, Yes), the rendering results are considered similar, and therefore the web page is content neutral (450). In some implementations, the similarity threshold may be high, for example 80% or higher. If the similarity score fails to meet the threshold (445, No), the system may consider the rendering results not similar (430). In some implementations, if the similarity score meets the similarity threshold (445, Yes), the system may perform additional similarity tests based on the rendering results that are not illustrated in FIG. 4. For example, the system may calculate a longest common sequence (LCS) for the DOM tree or the layout, or another component of the rendering result and use the LCS value to determine whether the rendering results are similar. For example, if the similarity of the LCS meets a threshold, the system may consider the rendering results similar. Once the system has determined whether the rendering results are similar (450) or not similar (430), process 400 ends.

Figure 5:
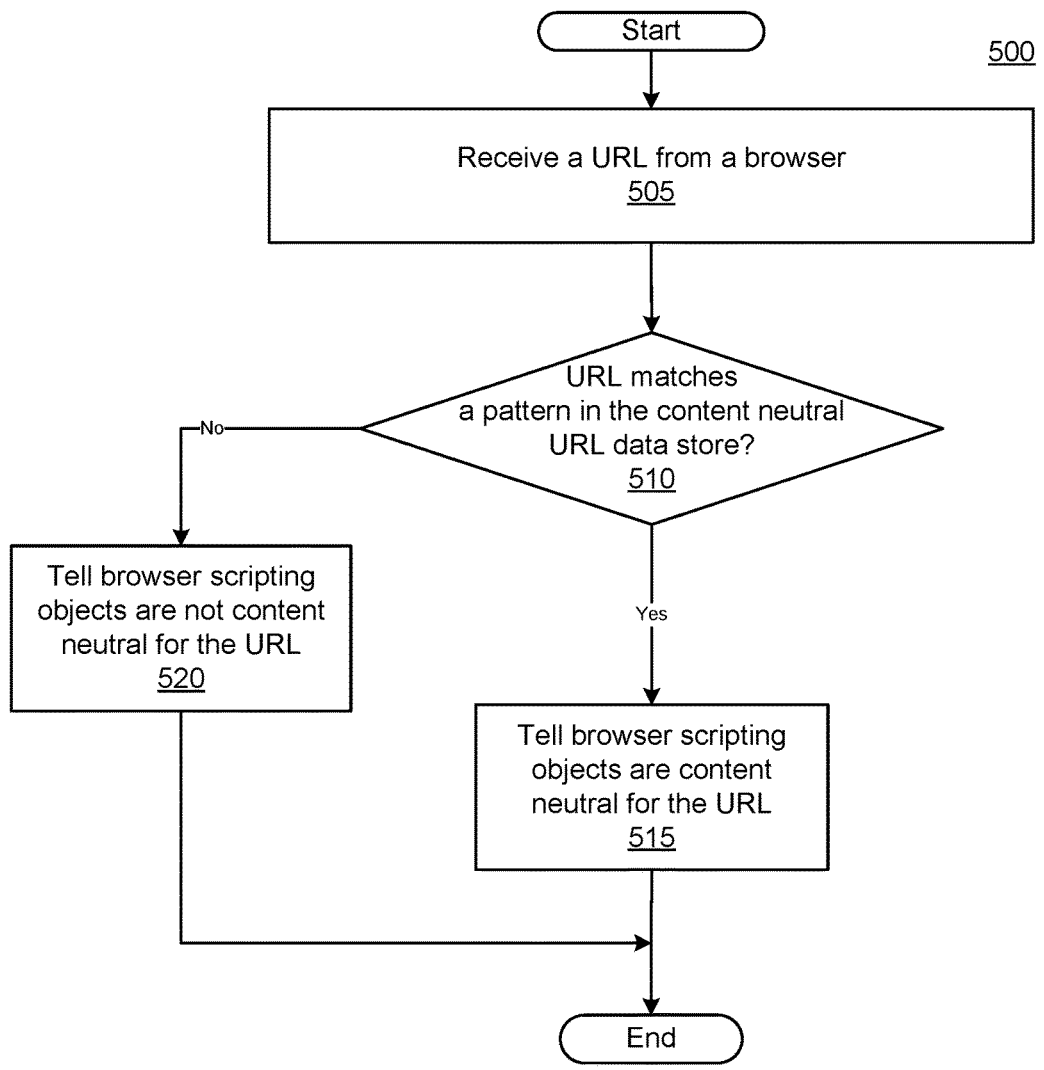
FIG. 5 is a flowchart illustrating an example process for providing information for optimized rendering, according to an implementation.

FIG. 5 is a flowchart illustrating an example process 500 for providing information for optimized rendering, according to an implementation. Process 500 may be run as a service for a browser. The browser can be a client browser, either mobile or full, such as browser 140 of FIG. 1, or a batch rendering engine, such as batch rendering engines 120 of FIG. 1. In some implementations, the service may be a cloud-based service. In other words, the browser may send a request via a network to a cloud-based service, which may provide a response to the browser. In some implementations the service may be run on a server, such as batch rendering system 110 of FIG. 1. In other implementations, the service may be local to the computing device on which the browser runs. For example, the data store of content neutral URL patterns may be pushed to the computing device that runs the browser, and the service may be executed at the computing device. In some implementations, the service may be run on a client, such as client 180 of FIG. 1.

Process 500 begins with the service receiving a URL from a browser (505). The browser may be a mobile browser, a full browser, and may be run on a client or as a batch rendering engine. The service may determine whether the URL from the request matches a content neutral URL pattern (510). In some implementations, the pattern may represent a full URL, so that a match is made on the entire requested URL. In some implementations, the pattern may represent a partial URL, for example with a query string removed or with various portions replaced by wild-cards. If the requested URL does match at least one pattern in the content neutral data store (510, Yes), the service provides a response that indicates the URL is content neutral and can be rendered with scripting turned off (515). In response to this indication, the browser may render the URL with scripting off, saving processing and bandwidth resources. The browser may do this regardless of whether a browser setting to run script is turned on. If the requested URL does not match a pattern in the content neutral data store (510, No), the service provides a response that indicates that the URL is non-content neutral and content will be lost if rendered with scripting turned off. In response to this indication, the browser may render the URL in accordance with the browser setting to run script, which is usually set to render with scripting turned on. Process 500 then ends, having provided information that the browser can use to optimize the rendering process.

FIG. 6 shows an example of a generic computer device 600, which may be operated as batch rendering system 110, and/or client 180 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, e.g., a silicone-based hardware processor, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computing device, such as laptop computer 632, desktop computer 634, or tablet or smart phone 636. An entire system may be made up of multiple computing devices 600 communicating with each other. Other configurations are possible.

FIG. 7 shows an example of a generic computer device 700, which may be system 110 of FIG. 1, which may be used with the techniques described here. Computing device 700 is intended to represent various example forms of large-scale data processing devices, such as servers, blade servers, data centers, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing device 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 110, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of computing device 700 is an example only and the system may take on other layouts or configurations.

Various implementations can include implementation in one or more computer programs that are executable and/or interpretable on a programmable system including at least one programmable processor formed in a substrate, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   at least one processor;
   memory storing a data store that identifies URLs that are content neutral, wherein the URLs identified in the data store are each linked to rendered content determined to be similar with scripting turned on and with scripting turned off; and
   memory storing instructions that, when executed by the at least one processor, cause the system to:
      receive a request to render a web page identified by a URL;
      prior to rendering, determine that the URL is identified as content neutral in the data store; and
      responsive to determining that the URL is identified as content neutral, render the web page with scripting turned off, regardless of browser settings for scripting.

2. The system of claim 1, wherein determining that the URL is identified as a content neutral URL in the data store includes determining that the URL matches a predetermined pattern in the data store.

3. The system of claim 1, wherein the system is a mobile device and a mobile browser initiates the request.

4. The system of claim 3, wherein the data store includes an indication of whether the URL is content neutral for two or more browser types.

5. The system of claim 4, wherein the data store includes an indication of whether the URL is content neutral for two or more browser types.

6. The system of claim 5, wherein the two or more browser types include a mobile browser and a desktop browser.

7. The system of claim 1, wherein determining similarity of rendered content with scripting turned on and with scripting turned off is based on a page layout of the web page.

8. The system of claim 7, wherein similarity of the page layout is based on similarity of tokens in the web page.

9. The system of claim 7, wherein similarity of the page layout is based on similarity of major components in a document object model (DOM tree).

10. The system of claim 1, wherein the memory further stores instructions that, when executed by the at least one processor, cause the system to receive an update to the data store from a service.

11. A method comprising:
    receiving a URL from a requestor;
    determining whether the URL is in a data store that identifies URLs that are content neutral, wherein the URLs identified in the data store are each linked to rendered content determined to be similar with scripting turned on and with scripting turned off;
    providing a response indicating the URL is content neutral when the URL is identified in the data store; and
    providing a response indicating the URL is not content neutral when the URL is not identified in the data store,
    wherein the requestor renders a web page with scripting turn off, regardless of browser settings for scripting, responsive to receiving the response indicating the URL is content neutral.

12. The method of claim 11, wherein the requestor is a mobile browser.

13. The method of claim 11, wherein the requestor is a batch rendering engine.

14. The method of claim 11, wherein determining whether the URL is identified as a content neutral includes matching the URL to a URL pattern.

15. The method of claim 11, wherein the data store that identifies content neutral URLs includes an indication of a type of browser.

16. The method of claim 15, wherein at least one URL in the data store is identified as content neutral for a mobile browser but not for a full browser.

17. The method of claim 11, wherein determining similarity of rendered content with scripting turned on and with scripting turned off is based on a page layout of the web page.

18. The method of claim 17, wherein similarity of the page layout is based on similarity of tokens in the web page.

19. The method of claim 17, wherein similarity of the page layout is based on similarity of outlinks in the web page.

20. The method of claim 17, wherein similarity of the page layout is based on similarity of major components in a document object model (DOM tree).

* * * * *